UNITED STATES PATENT OFFICE.

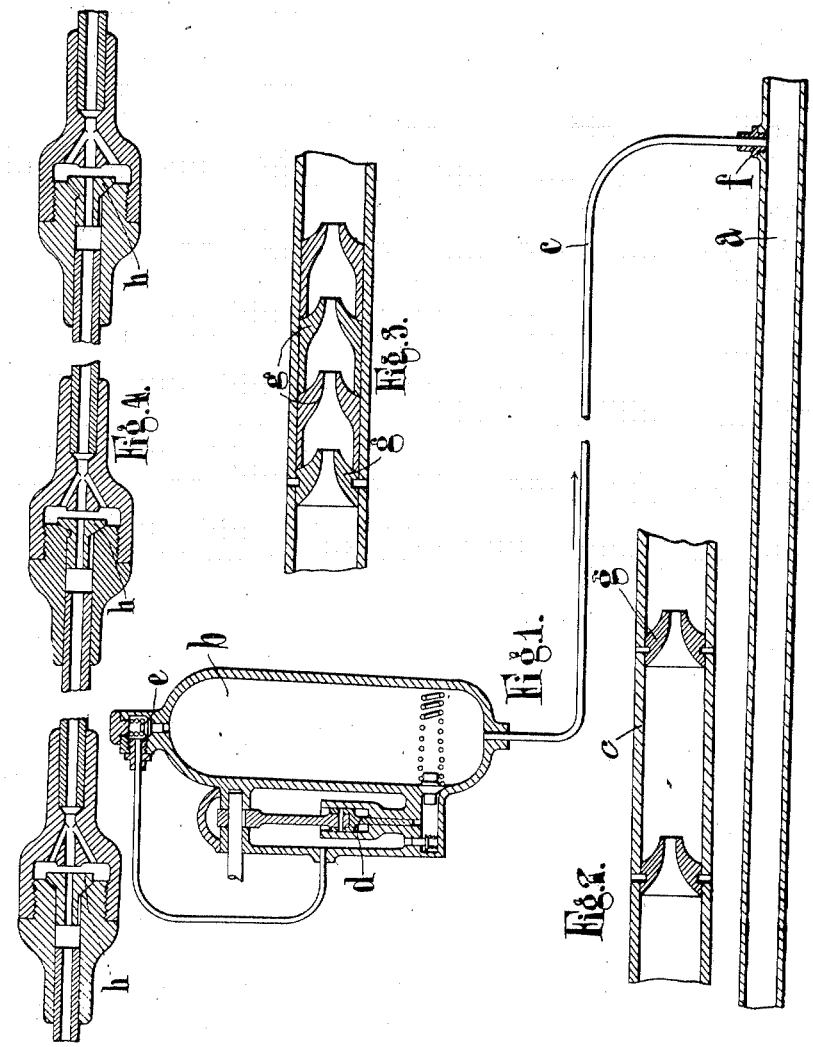

GOGU CONSTANTINESCO, OF ALPERTON, ENGLAND, ASSIGNOR OF ONE-HALF TO WALTER HADDON, OF LONDON, ENGLAND.

MEANS FOR FEEDING LIQUID WAVE-TRANSMISSION LINES.

1,334,285. Specification of Letters Patent. Patented Mar. 23, 1920.

Application filed December 13, 1917, Serial No. 207,021. Renewed October 28, 1919. Serial No. 334,079.

*To all whom it may concern:*

Be it known that I, GOGU CONSTANTINESCO, a subject of the King of Great Britain and Ireland, residing at "Westoe," Stanley avenue, Alperton, in the county of Middlesex, England, have invented certain new and useful Means for Feeding Liquid Wave-Transmission Lines, of which the following is a specification.

The present invention relates to wave transmission systems.

The invention consists in feeding means for a wave transmission line transmitting either harmonic or impulsive waves comprising a small bore pipe of considerable length, or a pipe provided with unidirectional dampers adapted to damp out the waves passing from the main transmission line to the feeding means.

The invention further consists in the improved means for feeding wave transmission lines hereinafter described.

Referring to the accompanying diagrammatic drawings:—

Figure 1 shows a wave transmission line with a feed pipe reservoir and pump;

Fig. 2 is a section showing suitable dampers for placing in the feed pipe;

Fig. 3 shows a modified form of damper; while

Fig. 4 shows check valves suitable for use instead of the dampers shown in Figs. 2 and 3.

In carrying the invention into effect according to the example illustrated in Fig. 1 as applied to an impulse wave line $a$, the wave line is connected to a reservoir $b$ through a pipe $c$ of considerable length and having a relatively small bore. Liquid is pumped into the reservoir $b$ by a pump $d$ and the reservoir is provided with a non-return valve $e$ so that when a definite predetermined pressure is reached the pump merely circulates liquid through the reservoir.

The object of the pump $d$ is to pump liquid from any suitable reservoir into the vessel $b$ from which it passes through the pipe $c$ into the wave transmission pipe $a$ to make up for any leakage which may occur from this pipe.

We have found by mathematical analysis that the wave in the main line $a$ splits into two parts at the junction $f$ with the feeding line almost in proportion to the relative sections of the pipes provided that the feeding line is sufficiently long. Under these conditions if the feeding line has a relatively small bore compared with the main line, very little energy will be lost in the feeding line.

This is only the case where the feeding line is sufficiently long; for instance, if the feeding line were very short or reduced to a simple aperture, a very considerable amount of energy would be lost owing to the fact that the flow through the short line, or through the aperture, would follow a simple hydraulic law. For instance, the velocity of the liquid through a very short piece of pipe, neglecting friction, if water is employed would be given by the following formula:—

$$v = 1420\sqrt{p}$$

where $v$ is the velocity in centimeters per second and $p$ the pressure in kilograms per square centimeter. For example, if $p=100$ kilograms per square centimeter, $v$ is equal to 14200 centimeters per second, which is a very high velocity. If a sufficiently long pipe is employed a sudden rise of pressure would create a wave traveling along the pipe with substantially the speed of sound, but the instantaneous velocity of the liquid would be only $v=7p$ if water be employed. In this case, if $p=100$ kilograms per square centimeter, $v=700$ centimeters per second, or nearly twenty times less than in the case of the short pipe. It follows from this that very much less energy would pass into the feeding line from the main line. The length of the feeding line should be preferably of the order of the wave length, and at least a quarter of the wave length due to the sudden rise of pressure. This wave length can be calculated approximately by the formula:—

$$\lambda = 145000\ \varphi \text{ for water}$$

and $$\lambda = 12500\ \varphi \text{ for petroleum products,}$$

where $\varphi$ is the duration of time taken by the percussion which produces the wave. For example, if the main wave consists of a rise of pressure from a minimum to a maximum and then back to a minimum during a time interval of $\frac{1}{500}$ of a second, the wave length in water would be $\lambda=290$ centimeters, and the feeding tube in this case should be at least 73 centimeters long. Care should be taken that the feeding tube is not an exact multiple of the half wave length due to the subdivision of the time period between successive percussions in the case in which these percussions succeed each other at regular intervals. In this case the loss of energy in the feeding tube might become considerable on account of resonance occurring in the feeding tube. If this cannot be avoided a wave damping device should be introduced in the feeding tube in order to destroy the waves. Such a damping effect may be readily obtained if a fairly long tube of very small bore is used, in order to increase friction, say, of several wave lengths, but it can be provided for in a shorter tube by a wave absorber such as hereinafter described. Such an absorber, examples of which are shown in Figs. 2, 3 and 4, may consist, as shown in Fig. 2, of simple diaphragms or nozzles $g$ of restricted area fitted at the pump end or at intervals along the feeding tube $c$.

A suitable form of damper both for harmonic and impulsive waves may be formed of conical or like nozzles, such as $g$, placed either at intervals, as shown in Fig. 2, or close together, as shown in Fig. 3. I prefer, however, to use perforated check valves, such as $h$, Fig. 4, in order not to interfere with the free flow of liquid from the pump or reservoir to the main line.

Having now fully described and ascertained my said invention and the manner in which it is to be performed, I declare that what I claim is:—

1. A hydraulic transmission system comprising: a pipe containing liquid through which power is transmitted by variations of pressure and volume therein, and means preventing considerable energy losses in said pipe while supplying liquid thereto to compensate for liquid losses in the system.

2. A hydraulic transmission system comprising: a pipe containing liquid through which power is transmitted by variations of pressure and volume therein, and a feed pipe communicating with said first pipe to supply liquid thereto to compensate for liquid losses in the system without causing substantial energy loss therein.

3. A hydraulic transmission system comprising: a pipe containing liquid through which power is transmitted by variations of pressure and volume therein, and means for supplying liquid to said pipe to compensate for liquid losses in the system including a feed pipe of small diameter as compared with said first pipe and of considerable length.

4. A hydraulic transmission system comprising: a pipe containing liquid through which power is transmitted by variations of pressure and volume therein, means for supplying liquid to said pipe to compensate for liquid losses in the system including a feed pipe of small diameter as compared with said first pipe and of considerable length, and unidirectional dampers located in said feed pipe.

5. Means for supplying fresh liquid to a wave transmission line comprising: a pump, means for supplying liquid to said pump, a strong vessel completely filled with liquid, said pump pumping liquid into said vessel, a pipe in which power is transmitted by variations of pressure and volume traveling along the pipe and a long pipe of small diameter connecting said strong vessel with said transmission pipe.

6. Means for supplying fresh liquid to a wave transmission line comprising: a pump, means for supplying liquid to said pump, a strong vessel completely filled with liquid, said pump pumping liquid into said vessel, a pipe in which power is transmitted by variations of pressure and volume traveling along the pipe and a long pipe of small diameter connecting said strong vessel with said transmission pipe, a by-pass from said vessel back to the suction side of said pump, said by-pass being controlled by a valve.

7. Means for supplying fresh liquid to a wave transmission line comprising: a pump, means for supplying liquid to said pump, a strong vessel completely filled with liquid, said pump pumping liquid into said vessel, a pipe in which power is transmitted by variations of pressure and volume traveling along the pipe, and a long pipe of small diameter connecting said strong vessel with said transmission pipe, said pipe of small diameter having placed therein wave absorbers.

In testimony whereof I have signed my name to this specification.

GOGU CONSTANTINESCO.